Figure 1:
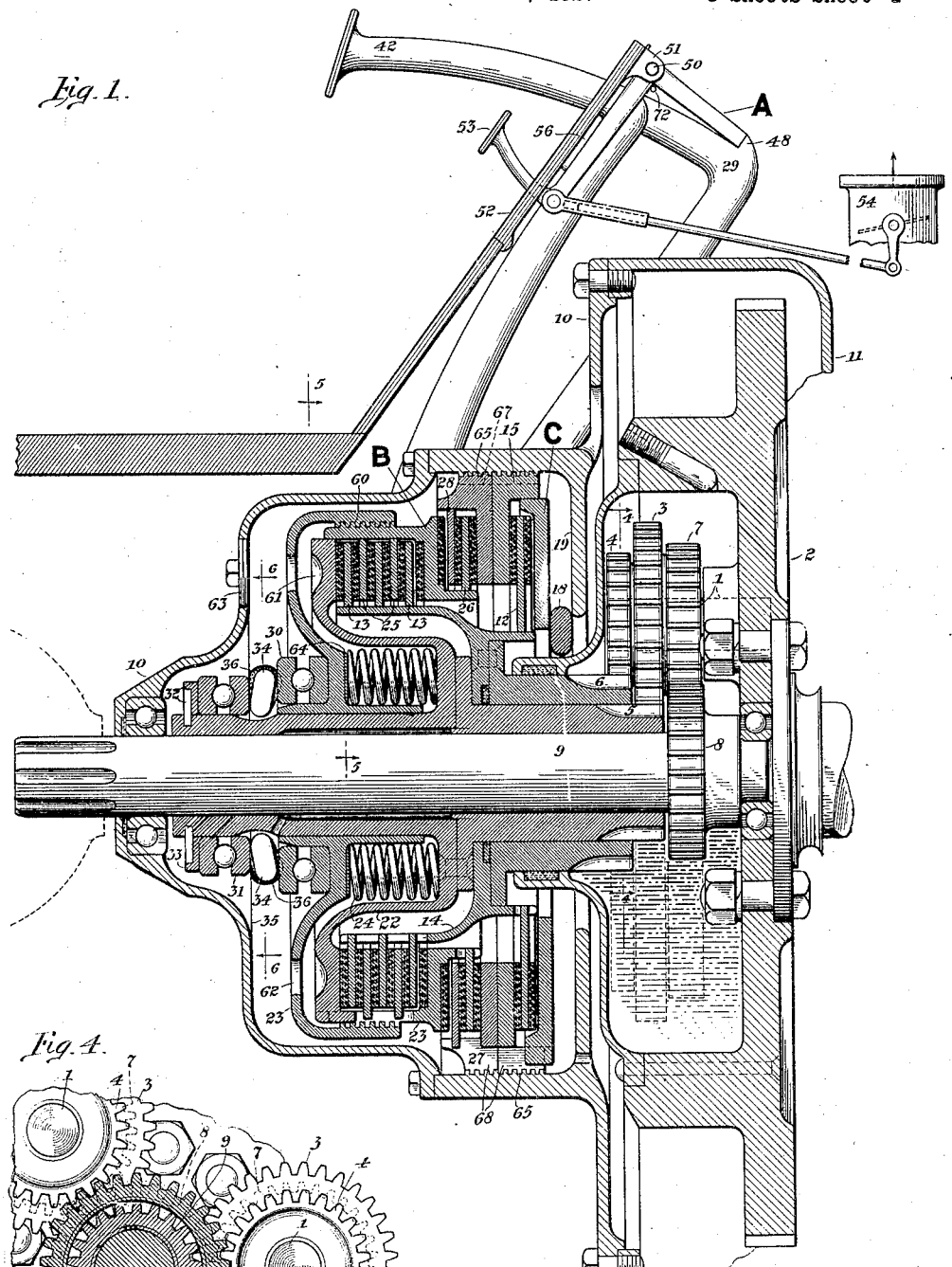

Jan. 31, 1928.

W. C. SMITH 1,658,021

AUTOMOBILE TRANSMISSION MECHANISM

Filed March 2, 1927     5 Sheets-Sheet 1

Inventor:
William C. Smith
By Jones, Addington, Ames & Seibold
Attys.

Jan. 31, 1928.
W. C. SMITH
1,658,021
AUTOMOBILE TRANSMISSION MECHANISM
Filed March 2, 1927    5 Sheets-Sheet 2
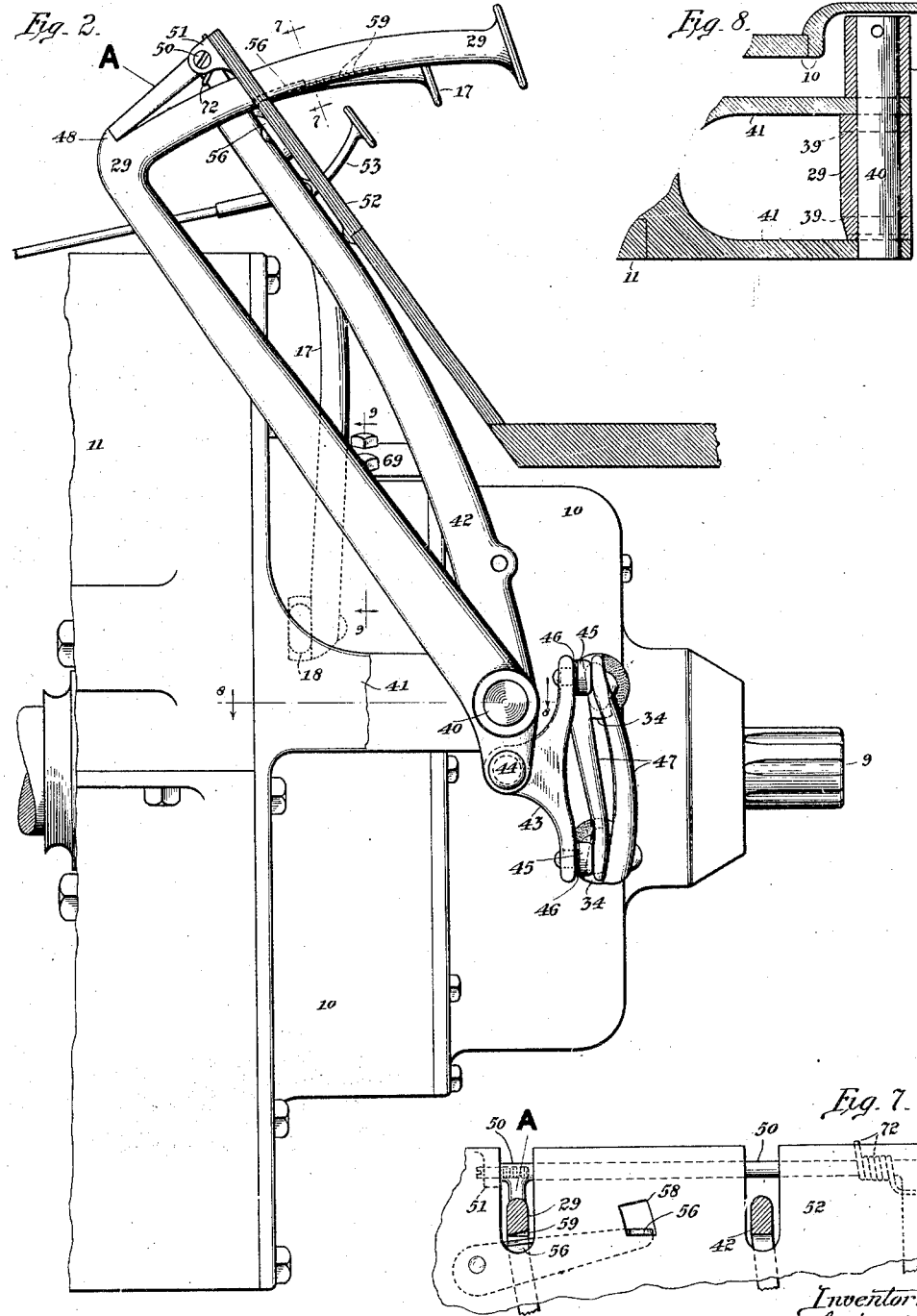

Jan. 31, 1928.
W. C. SMITH
1,658,021
AUTOMOBILE TRANSMISSION MECHANISM
Filed March 2, 1927     5 Sheets-Sheet 3
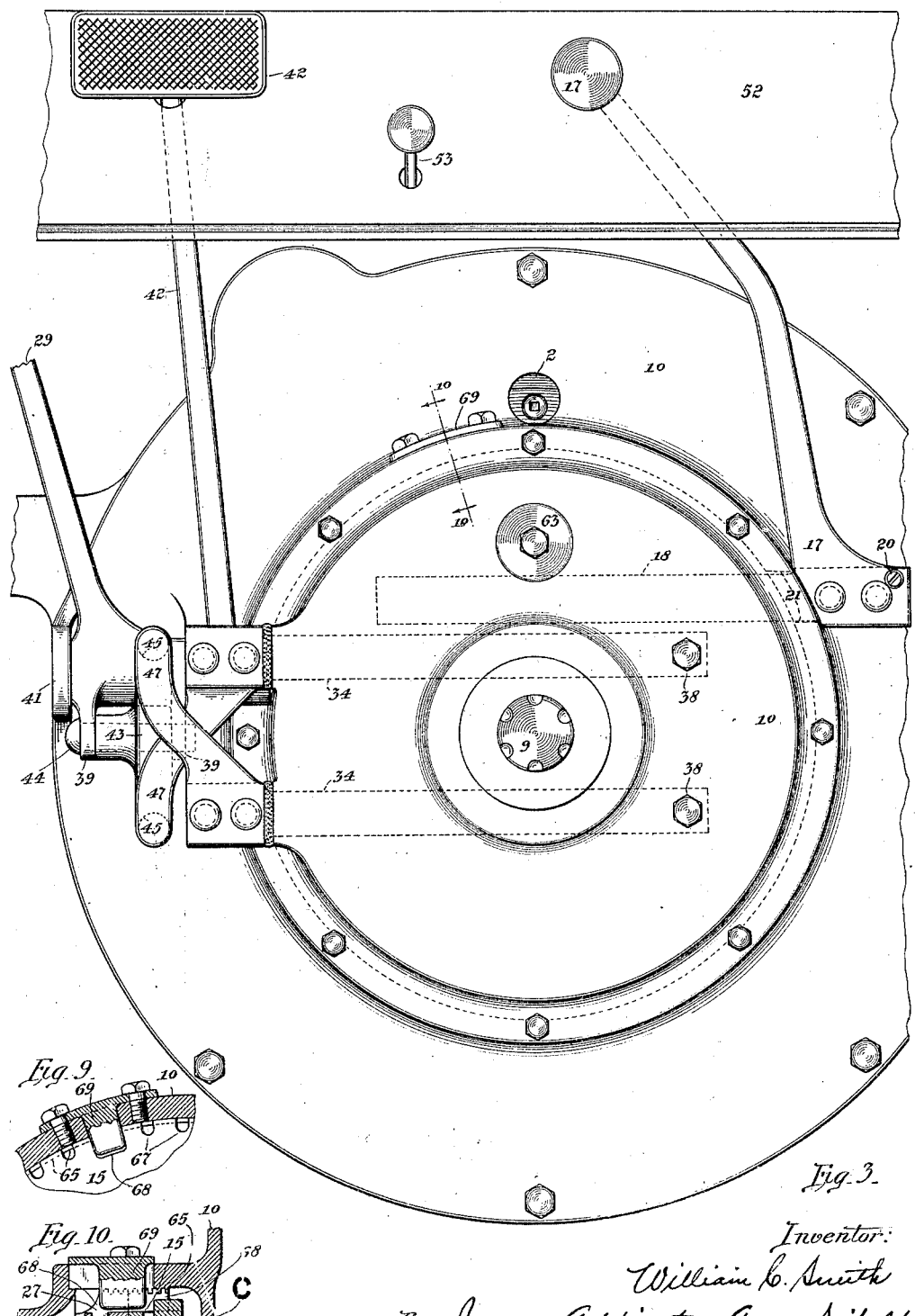

Jan. 31, 1928.
W. C. SMITH
1,658,021
AUTOMOBILE TRANSMISSION MECHANISM
Filed March 2, 1927    5 Sheets-Sheet 4
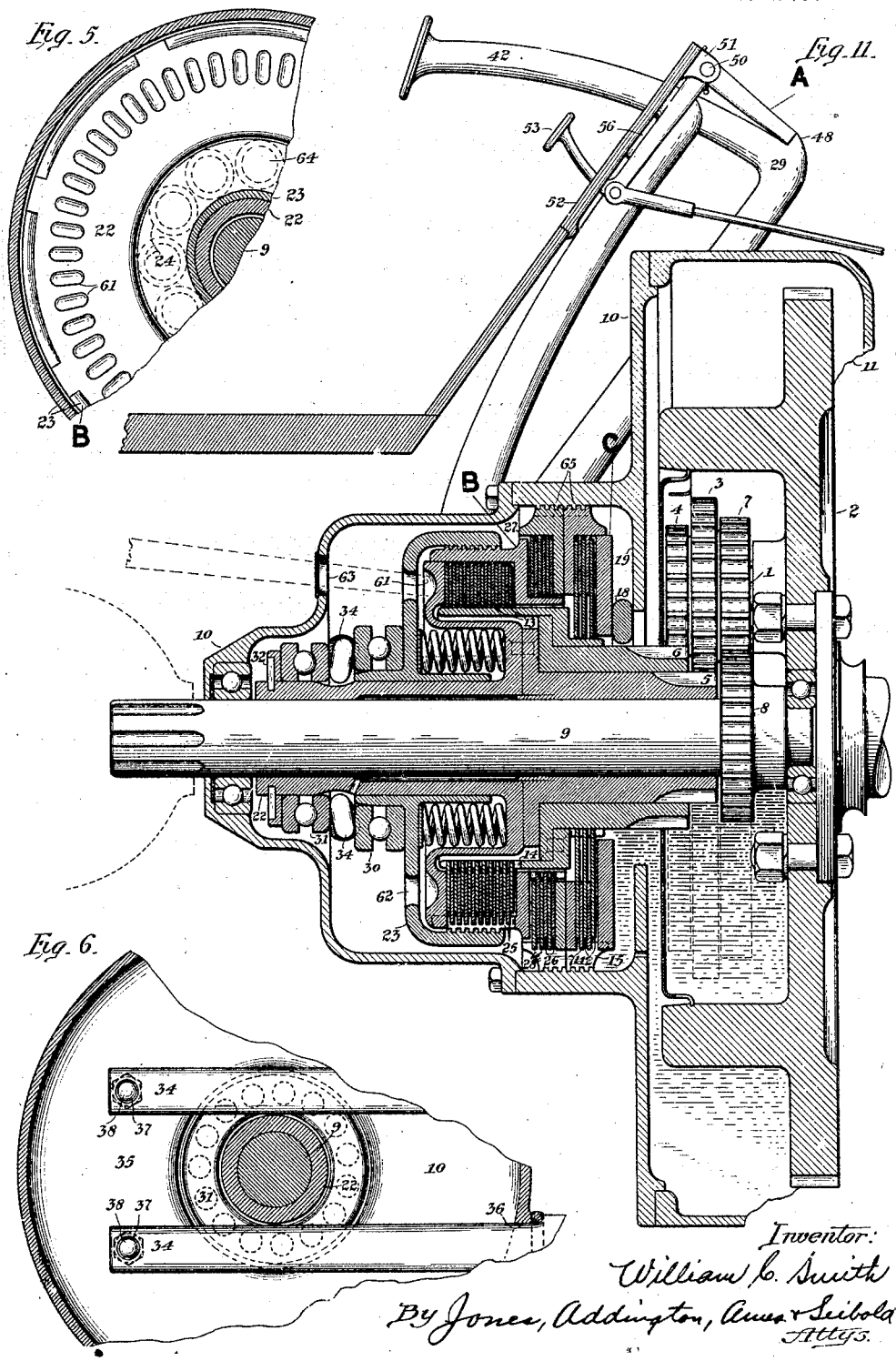
Inventor:
William C. Smith
By Jones, Addington, Ames & Seibold
Attys.

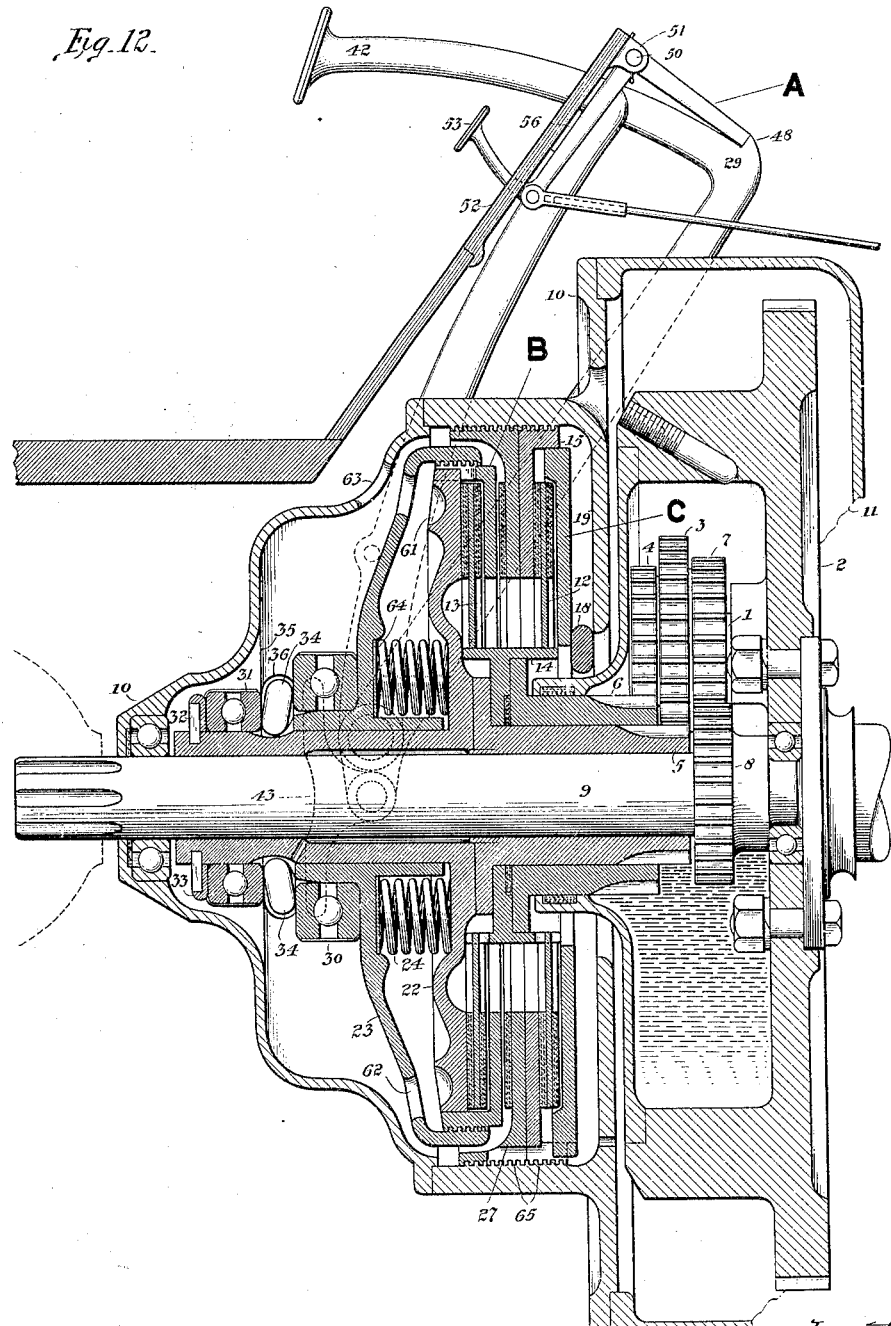

Patented Jan. 31, 1928.

1,658,021

UNITED STATES PATENT OFFICE.

WILLIAM C. SMITH, OF CHICAGO, ILLINOIS.

AUTOMOBILE TRANSMISSION MECHANISM.

Application filed March 2, 1927. Serial No. 172,073.

My invention relates to automobile transmission mechanism.

The mechanism includes planetary gears meshing with sun gears and with a gear fixed to rotate with a transmission shaft. In operation, when a sun gear is arrested, a corresponding speed is transmitted to the transmission shaft; such a type of gears being shown in expired Patent No. 863,317.

An object of the invention is to provide an automobile transmission mechanism having the above-named parts, with a disc having lateral friction faces fixed to rotate with a sun gear, a pedal, and frictional arresting means in operative relation with the pedal adapted to engage the disc faces for arresting the sun gear when the pedal is depressed by the operator; whereby a speed is obtained by double frictional resistance and a single movement on the part of the operator without transverse stresses in the mechanism. It is well known, in a drum and brake band construction for sun gear arresting purposes, that the resultant of the tangential pull of the band in two directions is a radial or transverse stress which throws the gears out of even mesh, causing gear noise and vibration; and that this stress produces internal friction, or a braking action on the bearings within the drum, which detracts from the amount of power which otherwise would be available. And, brake bands offering but a single frictional resistance require high pressure which causes rapid wear and frequent renewals.

A further object is to provide an automobile transmission mechanism having a pair of sun gears, with operative mechanism for frictionally arresting each gear, automatically locking the gears together, unlocking the gears, and compelling the gears to remain normally unlocked for free idle rotation.

And further objects are, first, to provide a self-engaging disc clutch for automatically locking sun gears together; second, to provide balanced clutch disengaging means for unlocking the sun gears of such construction as to exert equal pressures in opposite directions on clutch clamping elements against clutch spring resistance, whereby engine end thrust resulting in frictional loss and crank shaft bearing wear is prevented; third, to provide automatic retaining means co-operating with the clutch disengaging means for holding the clutch normally disengaged and compelling the sun gears to remain normally unlocked for free idle rotation; fourth, to provide an engine accelerator pedal adapted to move the retaining means to inoperative position, whereby automatic clutch engagement is permitted; fifth, to provide a normally neutral clutch clamping element capable not only of engaging the clutch for high speed, but also of engaging arresting means for low speed; sixth, to provide clutch adjusting means of such construction that the clutch springs lock the adjustment; seventh, to provide a pawl capable of locking the car, or the low speed when desired; and eighth, to provide a service brake pedal and a reverse speed pedal suitable for emergency braking purposes.

Figure 4:
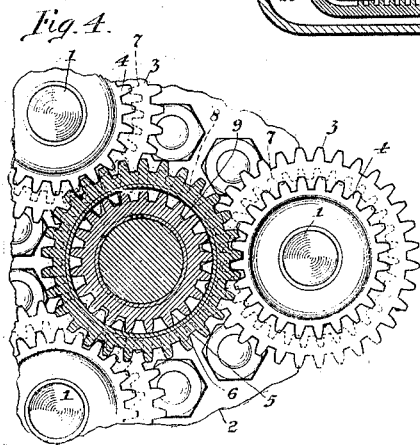

I attain these objects by the mechanism illustrated in the accompanying drawings, in which Fig. 1 is substantially a vertical section of the mechanism showing operating parts in neutral position. Figs. 2 and 3 are, respectively, side and rear elevations of the mechanism. Figs. 4, 5 and 6 are transverse sections of parts of the mechanism on corresponding lines, Fig. 1. Fig. 7 is a sectional view of control parts on line 7—7, Fig. 2. Fig. 8 is a plan section of a pedal bracket on line 8—8, Fig. 2. Fig. 9 is a vertical section of a part of the mechanism on line 9—9, Fig. 2. Fig. 10 is a sectional view of a part of the mechanism on line 10—10, Fig. 3. And, Figs. 11 and 12 are vertical sections of modified forms of mechanism.

A form of construction as shown in Figs. 1 to 10, inclusive, comprises planetary gear sets rotatably mounted on shafts 1 of an engine fly wheel 2. Each gear set includes gears 3 and 4 meshing with low and reverse speed sun gears 5 and 6, respectively, and a gear 7 meshing with a gear 8 fixed to rotate with a transmission shaft 9 which is journaled at one end in fly wheel 2 and at the other in a two-part housing 10 secured to a housing 11.

A reverse speed disc 12 and clutch discs 13 are fixed to rotate with gear 6 through the medium of a gear extension 14 to which the discs are splined. Frictional arresting means for disc 12 include a normally stationary abutment 15 and a plate C splined thereto. An operative relation between abutment 15, plate C, and a reverse speed pedal 17 is formed by a pedal cam shaft 18 which is interposed between said plate and a housing flange 19, the cam shaft being adapted to rock on the flange and plate for pressing the plate against the disc and the disc against the abutment, in order to arrest the disc and gear 6. Cam shaft 18 projects through housing 10 and is held in position by a retaining screw 20, a clearance aperture 21 being indicated by dotted lines in Fig. 3.

A clutch clamping element 22 is secured to gear 5 and splined to a member B of a clutch clamping element 23 which is sleeved to element 22, these elements being spring-pressed in opposite directions by means of clutch springs 24. Element 23 includes clamping discs 25 splined to member B, and these clamping discs together with element 22 and member B are adapted to clamp discs 13 automatically for locking gears 5 and 6 together.

A low speed disc 26 is fixed to rotate with gear 5 through the medium of element 22 and member B to which the disc is splined. Frictional arresting means for disc 26 include a normally stationary abutment 27 and a disc abutment 28 splined thereto. An operative relation between abutments 27 and 28 and a clutch pedal 29 is formed by element 23, including member B, and parts of clutch disengaging means described hereinafter, said member being adapted to abut disc abutment 28 and press the same against disc 26 and disc 26 against abutment 27 for arresting itself, disc 26 and gear 5. Element 23 includes a ball thrust bearing 30, and element 22 includes a similar bearing 31 held in operative position by means of retaining collars 32 and 33.

Clutch disengaging means for unlocking gears 5 and 6 include parallel laterally extending cam shafts 34 interposed between bearings 30 and 31 equi-distant from the centers thereof and adapted to rock on lateral faces of said bearings as well as on a flat surface 35 parallel to said faces formed in housing 10, said shafts projecting through clearance apertures 36 in said housing and being provided at their inner ends with holes 37 for the reception of retaining screws 38. Cam shafts 34 have long rocking contacts which coincide with chords of the circular bearing faces. The pressures exerted on the bearings are equal and opposite in direction, reaction on bearing 31 being equal and opposite to the pressure required to move bearing 30 forwardly for clutch disengagement. Clutch pedal 29 having downward extensions 39 is pivoted to a shaft 40 mounted in a bracket 41 integral with housing 10, and a brake pedal 42 adapted to be connected to a brake in the usual manner is also pivoted to said shaft. An equalizer 43 pivoted to a pin 44 in extensions 39 is provided with headed pins 45 seating on adjusting washers 46 and bearing against the free ends of cam shaft arms 47 for rocking the cam shafts in opposite directions.

Automatic retaining means co-operating with pedal 29 of the clutch disengaging means for holding the clutch normally disengaged and compelling gears 5 and 6 to be normally unlocked for free idle rotation comprise a pedal tooth 48 and a self-engaging pawl A normally engaged therewith, said pawl holding the pedal in neutral position and projecting from one end of a shaft 50 journaled in bearings 51 on a foot board 52. A spring-pressed engine accelerator pedal 53 having operative relation with an engine carburetor 54 and projecting from the other end of said shaft is adapted to raise pawl A out of the path of tooth 48 for permitting clutch engagement. A gravity-operated pawl 56 swiveled to footboard 52 and projecting through an opening 58 therein is adapted when actuated by the operator to engage ratchet teeth 59 on pedal 29 and hold the pedal in depressed low speed position for locking the low speed when the engine is running. or the car when the engine is dead.

In operation, when pedal 29 is depressed, low speed is obtained, the pedal returning to neutral position by the action of the clutch springs upon release of pressure. For low speed and change to high speed, pedal 29 is first depressed then the accelerator pedal to permit rearward movement of pedal 29 past neutral to high speed position upon release of pressure. To stop the car, pressure on the brake pedal only is required after pedal 29 has been depressed to or beyond neutral position. For reverse speed, pedal 17 only is depressed, this pedal also serving for emergency braking purposes.

Clutch adjusting means include a screw-threaded connection 60 between member B of element 23 and the spring-pressed portion thereof, recesses 61 in element 22, one or more holes 62 in element 23 registering with said recesses, and a normally closed opening 63 in housing 10. To adjust the clutch, a suitable pry is employed for turning element 22 and member B relative to the spring-pressed portion of element 23, an edge of a hole 62 serving as a fulcrum for the prying action. To alleviate friction during the turning movement, a washer 64 is interposed between springs 24 and element 23. Said springs lock the adjustment.

Adjusting means for abutments 15 and 27 include screw-threaded connections 65 between the abutments and housing 10. Peripheral notches 67 are provided for cooperation with a suitable tool for turning the abutments to effect the desired adjustment, and larger notches 68 are also provided for engagement with a locking lug 69 removably secured in housing 10.

The modified form of mechanism shown in Fig. 11 includes plain clutch discs, and disc abutments 71 splined to abutment 15.

And, the form shown in Fig. 12 includes a single disc or plate clutch, member B being adapted to have direct engagement with abutment 27.

For clearness of description, it is understood that frictional ring facings shown for discs and other parts form a part thereof, although in practice these ring facings may be loosely interposed between the discs or parts. And, the discs shown in Fig. 11, although plain, have lateral friction faces.

Frictional loss is not only prevented by the arresting discs but by the balanced clutch disengaging means, which cooperate in the saving of power during low and reverse speed intervals when maximum power is required. And, since there is no lost motion of pedal 29 due to engine crank shaft bearing wear, the pedal may have a high leverage with consequent ease of operation.

It will be noted that neutral positioning of parts requires no attention on the part of the operator, since pawl A is self-engaging by means of a spring 72 on shaft 50 and raised out of engaging position when the accelerator pedal is depressed to accelerate the car speed before changing to high speed.

What I claim is:

1. An automobile transmission mechanism comprising in combination, a transmission shaft and a driven gear fixed thereto, a sun gear surrounding said shaft, an engine fly wheel, a shaft projecting from said fly wheel and a planetary gear set rotatably mounted thereon, said gear set comprising a driving gear in constant mesh with said driven gear and a gear in constant mesh with said sun gear, an annular disc fixed to rotate with said sun gear but free to move axially relative thereto, frictional arresting means adjacent one lateral face of said disc, a control pedal, and a second frictional arresting means in operative relation with said pedal adjacent the other lateral face of said disc, the construction being such that each frictional means is compelled to engage its respective disc face for arresting the disc when the pedal is depressed by the operator.

2. An automobile transmission mechanism comprising in combination, a transmission shaft and a gear fixed to rotate therewith, a sun gear, planetary gears meshing with said gears, an axially movable element having a friction face fixed to rotate with the sun gear, an arresting abutment adjacent said face, a housing having a transverse surface, cam shafts adapted to rock on said surface, and an element for forcing said face against the abutment, and a pedal in operative relation with said shafts for rocking the same.

3. An automobile transmission mechanism comprising in combination, a transmission shaft and a gear thereon, a sun gear, planetary gears meshing with said gears, a disc fixed to rotate with the sun gear, an arresting abutment at one side of the disc and a movable plate held against rotation at the other, a housing flange, a cam shaft interposed between said flange and plate and adapted to press the plate against the disc and the disc against the abutment, and a pedal on said cam shaft.

4. An automobile transmission mechanism comprising in combination, a transmission shaft and a gear fixed to rotate therewith; two sun gears; planetary gears meshing with said gears; and operative mechanism for frictionally arresting each sun gear, automatically locking the sun gears together, unlocking the sun gears, automatically holding the sun gears normally unlocked for free idle rotation, and releasing the holding mechanism for permitting the automatic locking action.

5. An automobile transmission mechanism comprising in combination, a transmission shaft and a gear thereon; two sun gears; planetary gears meshing with said gears; means for arresting one sun gear and clutch discs fixed to rotate therewith; spring-actuated clutch clamping elements fixed to rotate with the other sun gear and adapted to engage the discs automatically; and operative mechanism for disengaging the elements, holding the elements normally disengaged, releasing the elements for automatic engagement, and arresting the elements.

6. An automobile transmission mechanism comprising in combination, a transmission shaft and a gear thereon; two sun gears; planetary gears meshing with said gears; two discs fixed to rotate with one sun gear; means for arresting one disc; spring-pressed clamping elements fixed to rotate with the other sun gear and adapted to engage the other disc automatically; and operative mechanism for disengaging the elements, automatically holding the elements disengaged, releasing the elements for automatic engagement, and arresting the elements.

7. An automobile transmission mechanism comprising in combination, two operative sun gears, two discs fixed to rotate with one gear, means for arresting one disc, spring-actuated clamping elements fixed to rotate with the other gear and adapted to engage the other disc automatically, frictional arresting means adjacent one clamping element, and means for disengaging the clamping elements and forcing said element into engagement with the arresting means.

8. An automobile transmission mechanism comprising in combination, two operative sun gears and arresting means for each, spring-pressed clutch clamping elements fixed to rotate with one gear, a clutch disc element fixed to rotate with the other gear and adapted for engagement with said elements, each clamping element including a ball thrust bearing, clutch disengaging cam shafts interposed between the bearings and adapted to rock thereon for exerting equal pressures in opposite directions on the clamping elements against the spring resistance, arms on the cam shafts, and a pedal and equalizer in operative relation with said arms for rocking the cam shafts.

9. An automobile transmission mechanism comprising in combination, two operative sun gears; means for arresting one gear and clutch discs fixed to rotate therewith; spring-actuated clamping elements fixed to rotate with the other gear and adapted to engage the discs automatically; frictional arresting means adjacent one clamping element; and operative mechanism for disengaging the clamping elements, forcing said element into engagement with the arresting means, and holding said element in a neutral position between the discs and arresting means.

10. An automobile transmission mechanism comprising in combination, two operative sun gears and arresting means for each; a clamping element having recesses carried by one gear; an aperture member sleeved to said element; an adjustable clamping member splined to said element and screw-threaded to the apertured member; clutch springs pressing said element and apertured member adapted to lock the clamping member against change of adjustment; clamping discs splined to the clamping member; and clutch discs carried by the other gear and operatively arranged with said element, clamping member, and discs; said recesses registering with apertures of the apertured member to facilitate turning thereof relative to said element for adjusting the clamping member against the spring resistance.

11. An automobile transmission mechanism comprising in combination, two operative sun gears and frictional arresting means for each, an operatively mounted self-engaging disc clutch for locking the gears together, clutch disengaging means including a pedal, self engaging pedal retaining means for holding the clutch normally disengaged, and an operatively related engine accelerator pedal for moving the retaining means to disengaging position.

12. An automobile transmission mechanism comprising in combination, a housing, two operative sun gears, a disc fixed to rotate with each gear, an arresting abutment for each disc having peripheral notches and a screw-threaded connection with said housing, means to facilitate turning of the abutments for adjusting purposes, and a locking lug removably secured in said housing for engagement with said notches.

13. The combination with a pedal and cooperating mechanism adapted to effect low speed in one position of the pedal and high speed in another position thereof, of means for holding the pedal in an intermediate neutral position, an operable engine accelerator, and means forming an operative relation between the accelerator and holding means adapted to release the latter when the accelerator is operated.

In testimony whereof, I affix my signature.

WILLIAM C. SMITH.